United States Patent Office 3,651,056
Patented Mar. 21, 1972

3,651,056
TRIAZINE DERIVATIVES
Mitsuo Muruyama, Yokohama, Akira Okabe, Fujisawa, Hideo Yamazaki, Hideaki Sakai, Tadao Shimazu, and Shotaro Kajiya, Yokohama, and Katsunobu Noda, Kamakura, Japan, assignors to Mitsui Toatsu Chemicals, Incorporated, Tokyo, Japan
No Drawing. Filed Dec. 24, 1969, Ser. No. 888,040
Int. Cl. C07d 55/20
U.S. Cl. 260—249.8                8 Claims

ABSTRACT OF THE DISCLOSURE

This invention is to provide novel 2,4-diamino-6-(OH-substituted alkoxy)-s-triazine compounds and bis(2,4-diamino-s-triazine-6-yl-oxy)-alkylene compounds which are useful as nonfoaming stabilizers for an aqueous solution of formaldehyde.

---

This invention relates to novel triazine derivatives which are useful as nonfoaming stabilizers for an aqueous solution of formaldehyde.

These compounds may be represented by the formula

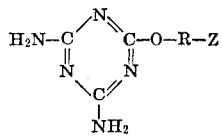

wherein R is an alkylene having 1 to 16 carbon atoms, Z is selected from the group consisting of

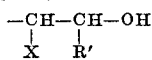

and

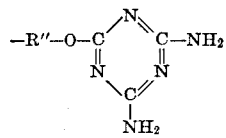

wherein X is selected from the group consisting of hydrogen and hydroxyl, R' is selected from the group consisting of hydrogen and an alkyl having 1 to 9 carbon atoms, R" is an alkylene having 2 to 17 carbon atoms, R and R' have a total of 4 to 16 carbon atoms and R and R" have a total of 6 to 18 carbon atoms.

More particularly the present invention relates to a 2,4 - diamine - 6 - (OH-substituted alkoxy)-s-triazine compound represented by the general formula

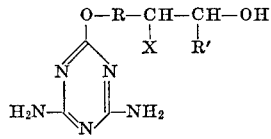

wherein R is an alkylene group of 1 to 16 carbon atoms, R' is a hydrogen atom or an alkyl group of 1 to 9 carbon atoms, X is a hydrogen atom or a hydroxyl group and the total of the carbon atoms of R and R' is 4 to 16 and bis(2,4-di-amino-s-triazine-6-yl-oxy) alkylene compounds represented by the general formula

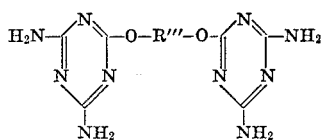

wherein R''' is an alkylene group of 6 to 18 carbon atoms.

Each of the compounds of the present invention, when added to an aqueous solution of high formaldehyde concentration, makes the solution stable at low temperatures and quickly destroys foams generated by strong agitation of the solution.

Generally, an unstabilized formaldehyde solution having a concentration of more than 30% is likely to polymerize, becomes white-turbid or deposits crystals of paraformaldehyde, is unsatisfactory as a raw material for making resins or organic compounds and is unsuitable for use in industry. As well known, 37% formaldehyde solutions containing large amounts of methanol (more than 10%) have been used commercially. The methanol is used to prevent polymerization. Even the formaldehyde solution with methanol is easily polymerized at low temperatures and deposits a large amount of crystals. In recent years, many efforts to develop an agent which keeps higher concentrations of formaldehyde stable in aqueous solutions having a lower content of methanol without producing a white-turbidity of crystals have been made. The smaller the amounts of methanol and higher the formaldehyde concentration and the strong agent necessary to stabilize such formaldehyde solutions, all increase the formation of foam in the formaldehyde solution. Therefore, during transportation, during measurement, during blending and during reaction with other compounds, foaming is a major problem pertinent to stabilized formaldehyde solutions. Efforts made to reduce foaming by adding a defoaming agent have not been successful. Thus, a stabilizer which has strong stabilizing properties and minimizes foaming without adding a defoaming agent is in great demand.

One object of the present invention is to provide a novel compound which is useful as a nonfoaming stabilizer for an aqueous solution of formaldehyde.

Another object of the present invention is to provide a novel nonfoaming stabilizer for aqueous solutions of formaldehyde.

A further object of the present invention is to provide a novel process for producing nonfoaming, stable, aqueous solutions of formaldehyde.

Another object of the present invention is to provide a process for producing a compound useful as a nonfoaming stabilizer for aqueous solutions of formaldehyde.

We have already discovered many excellent stabilizers for formaldehyde solution such as, for example, 2,4-diamino - 6 - dodecoxy-s-triazine and 2-amino-4-(bis-β-hydroxyethyl)amino-6-dodecoxy-s-triazine as a result of investigating numerous triazine type compounds. These have exhibited very remarkable stabilization of high concentration formaldehyde solutions low in methanol content. But they produce foam so easily that the help of a defoaming agent is required in practice. Therefore, we have investigated the chemical structure and stabilizing properties of s-triazine and its relation to foaming of formaldehyde solutions.

It is a well known fact that the amino group attached to an s-triazine skeleton is easily methylolated in a formaldehyde solution. In a formaldehyde solution, 2,4-diamino-6-dodecoxy-s-triazine,

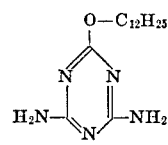

is a compound having a hydrophilic group in the methylolated form of the amino group and a dodecyl group of a hydrophobic nature which causes the foaming.

We have discovered compounds having a hydroxyl group at the terminal, or in the middle, of an alkyl group represented by Formula 1 and bis-triazine compounds as represented by Formula 2 destroy the hydrophobic nature of the alkyl or alkylene group and consequently destroy foaming of formaldehyde solutions containing these compounds.

Benzoguanamine is well known as a Formalin stabilizer and is effective in solution of 37% Formalin and 8% methanol. However, the stabilization is substantially zero or at best extremely poor in solutions containing less than 4% methanol. Benzoguanamine does not foam and there is no particular foaming problem in commerce. 2,4-diamino-6-dodecoxy-s-triazine is substantially more effective than benzoguanamine as a stabilizer, but actively promotes foaming and requires the presence of a defoaming agent in commerce. In the examples of the present application, benzoguanamine is made a control agent for comparing the foaming and 2,4-diamino-6-dodecoxy-s-triazine is used as a control for stabilization tests.

Another embodiment of the present invention provides a stable formaldehyde solution which deposits no paraformaldehyde even at low temperatures and which quickly destroys foams generated by strong agitation or strong shaking by the addition of 0.001 to 2 parts by weight of the novel compounds having the above-mentioned formulae per 100 parts by weight of a solution having a concentration of 30 to 50% and preferably 37 to 45% formaldehyde containing 1 to 20% and preferably 1 to 7% methanol.

The following compounds are exemplary of those included in the present invention:

2,4-diamino-6-(6-hydroxy-n-hexoxy)-s-triazine;
2,4-diamino-6-(8-hydroxy-n-octoxy)-s-triazine;
2,4-diamino-6-(6-hydroxy-heptoxy)-s-triazine;
2,4-diamino-6-(6-hydroxy-4-methyl-hexoxy)-s-triazine;
2,4-diamino-6-(10-hydroxy-n-decoxy)-s-triazine;
2,4-diamino-6-(12-hydroxy-n-dodecoxy)-s-triazine;
2,4-diamino-6-(14-hydroxy-n-tetradecoxy)-s-triazine;
2,4-diamino-6-(18-hydroxy-n-octadecoxy)-s-triazine;
2,4-diamino-6-(4-hydroxy-n-hexoxy)-s-triazine;
2,4-diamino-6-(12-hydroxy-n-octadecoxy)-s-triazine;
2,4-diamino-6-(6-hydroxy-7-methyl-octoxy)-s-triazine;
2,4-diamino-6-(9-hydroxy-n-octadecoxy)-s-triazine;
2,4-diamino-6-(6,7-dihydroxy-n-heptoxy)-s-triazine;
2,4-diamino-6-(9,10-dihydroxy-n-octadecoxy)-s-triazine;
bis-(2,4-diamino-s-triazine-6-yl-oxy)-octamethylene;
bis(2,4-diamino-s-triazine-6-yl-oxy)-3-methylheptylene;
bis(2,4-diamino-s-triazine-6-yl-oxy)-decamethylene;
bis(2,4-diamino-s-triazine-6-yl-oxy)-dodecamethylene;
bis(2,4-diamino-s-triazine-6-yl-oxy)-5,5-dimethyl decylene;
bis(2,4-diamino-s-triazine-6-yl-oxy)-tetradecamethylene;
bis(2,4-diamino-s-triazine-6-yl-oxy)-5,8-dimethyl dodecylene and
bis(2,4-diamino-s-triazine-6-yl-oxy)-hexadecamethylene.

The inventors have discovered that these compounds give stability to a formaldehyde solution far more remarkable than benzoguanamine, that the destruction of foams generated by the strong shaking of the stabilized formaldehyde solution is more rapid than with benzoguanamine and remarkably faster than with 2,4-diamino-6-dodecoxy-s-triazine. Therefore, foams in formaldehyde solutions stabilized with the compounds of the present invention are not a problem. The compounds which are prefered as Formalin stabilizers are those of the above-mentioned Formula 1 when both X and R' are hydrogen and the number of carbon atoms of R is 6 to 12; or when R' is an alkyl group and X is hydrogen and the total number of carbon atoms of R and R' is 6 to 12; and when R' is an alkyl group, X is a hydroxyl group, the total number of carbon atoms of R and R' is 10 to 16; and those of Formula 2 when the total number of carbon atoms of R and R'' is 8 to 14.

The substances represented by the Formulas 1 and 2 can be synthesized by reaction processes represented by the following two equations.

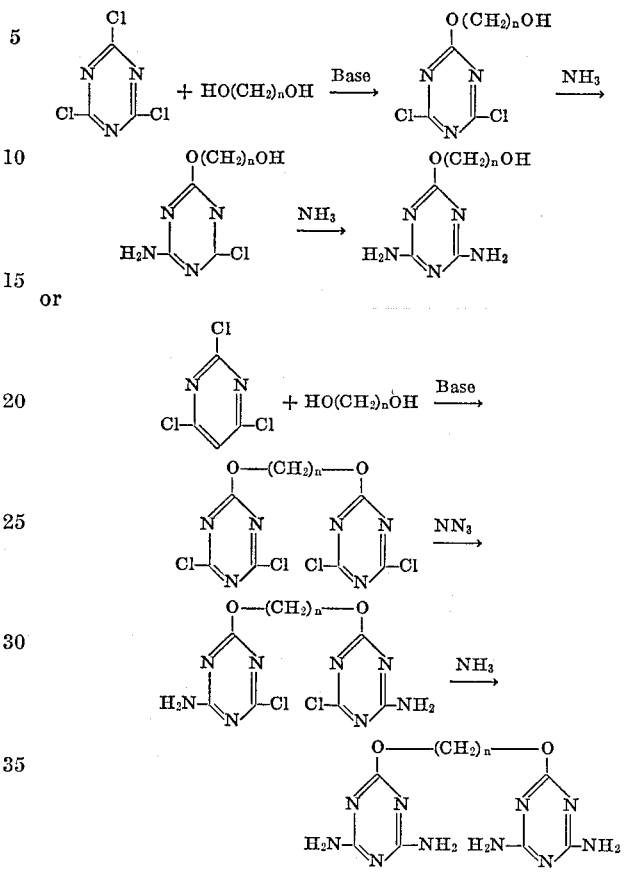

That is to say, the 2,4-diamino-6-(OH-substituted alkoxy)-s-triazine type compound represented by the Formula 1 can be prepared by reacting 1 mol of cyanuric chloride with approximately 1 mol, preferably about 0.8 to 1.2 mols, of a glycol or triol and reacting the product with ammonia. The bis(2,4-diamino-s-triazine-6-yl-oxy)-polymethylene type compound represented by the Formula 2 can be prepared by reacting 2 mols of cyanuric chloride with approximately 1 mol, preferably about 0.8 to 1.2 mols, of a glycol and reacting the product with ammonia.

Suitable polyols include polymethylene glycols, such as, hexamethylene glycol, octamethylene glycol, decamethylene glycol, dodecamethylene glycol and octadecamethylene glycol; branched chain glycols, such as, 3-methyl heptylene glycol, 5,5-dimethyl decylene glycol and 5,8-dimethyl dodecylene glycol; dihydric aliphatic alcohols, such as 1,6-dihydroxy-4-methylhexane, 1,6-dihydroxyheptane, 1,6-dihydroxy-7-methyloctane, 1,12-dihydroxyoctadecane and 1,9-dihydroxyoctadecane and trihydric aliphatic alcohols, such as 1,2,7-trihydroxyheptane and 1,2,10-trihydroxyoctadecane.

The reaction of cyanuric chloride with a glycol or triol is conducted in the presence of an acid scavenger and an inert solvent by agitation at a temperature of 30 to 90° C., preferably 40 to 60° C., for about 1 to 10 hours. Organic base, such as, pyridine, N,N-dimethyl aniline, N,N-diethyl aniline or an anion-exchange solution having a tertiary amino group or such inorganic base as sodium carbonate, sodium bicarbonate, calcium carbonate or quicklime are suitable as an acid scavenger. One or a mixture of two or more of such solvents as acetone, benzene, toluene, xylene, dioxane, ethylene glycol dimethyl ether and ethylene glycol diethyl ether are suitable. However, usually organic bases are more soluble in these solvents and are preferred to insoluble inorganic bases.

hyde solution with 0.02% benzoguanamine was heated and stored at 0° C., a polymer was immediately formed and stabilization was considered insignificant.

When the formaldehyde solution stabilized with 2,4-diamino - 6 - (10 - hydroxy - n - decoxy) - s - triazine was subjected to the foam test as in Example 1, the foam completely vanished within 10 seconds after the shaking was stopped.

EXAMPLE 3

11.0 g. of 2,4 - diamino - 6 - (12 - hydroxy - n - octadecoxy)-s-triazine having a melting point of 90 to 93° C. were obtained in the same manner as in Example 1 from 7.3 g. (0.05 mol) of cyanuric chloride, 14.3 g. (0.05 mol) of 12-hydroxystearyl alcohol and 9.3 g. (0.06 mol) of dimethyl aniline. The values from analysis are shown as follows:

Analyzed elements.—Test values (percent): C, 63.42; H, 10.43; N, 17.47. Theoretical values (percent): C, 63.76; H, 10.45; N, 17.70.

When an aqueous solution of 37.1% formaldehyde and 3.7% methanol with 0.02% 2,4-diamino-6-(12-hydroxy-n-octadecoxy)-s-triazine was heated at 65° C. for 2 hours and stored at 5° C., crystals of paraformaldehyde were not deposited for at least 8 days. When the same formaldehyde solution containing addition of 0.02% benzoguanamine instead of 2,4-diamino-6-(12-hydroxy-n-octadecoxy)-s-triazine was tested for comparison, there was no detectable stabilization.

When the formaldehyde solution stabilized with the 2,4 - diamino - 6 - (12 - hydroxy - n - octadecoxy) - s - triazine was subjected to the same foam dispersing test as in Example 1, the foam completely vanished with 45 seconds after the shaking was stopped.

EXAMPLE 4

5.0 g. of 2,4 - diamino - 6 - (9,10 - dihydroxy - n - octadecoxy)-s-triazine of a melting point of 116 to 120° C. were obtained in the same manner as in Example 1 from 6.2 g. (0.034 mol) of cyanuric chloride, 10.5 g. (0.034 mole) of 9,10-dihydroxystearyl alcohol and 4.4 g. (0.034 mol) of dimethyl aniline. The values from analysis are shown as follows:

Analyzed elements.—Test values (percent): C, 61.07; H, 10.11; N, 16.65. Theoretical values, (percent): C, 61.28; H, 10.04; N, 17.02.

When an aqueous solution of 37.1% formaldehyde and 3.7% methanol with 0.01% 2,4 - diamino - 6 - (9,10 - dihydroxy-n-octadecoxy)-s-triazine was heated at 65° C. for 2 hours and stored at 0° C., crystals of paraformaldehyde were not deposited for at least 4 days. When the same formaldehyde solution with the 0.02% benzoguanamine instead of the 2,4 - diamino - 6 - (9,10 - dihydroxy - n-octadecoxy)-s-triazine was tested for comparison, there was no detectable stabilization.

When the formaldehyde solution stabilized with 2,4-diamino - 6 - (9,10 - dihydroxy - n - octadecoxy) - s - triazine was subjected to the same foam test as in Example 1, the foam completely vanished within 30 seconds after shaking was stopped.

EXAMPLE 5

Bis(2,4 - diamino - s - triazine - 6 - yl - oxy)-dodecamethylene was synthesized as follows. 18.4 g. (0.1 mol) of cyanuric chloride, 9.8 g. (0.05 mol) of dodecamethylene glycol, 13.3 g. (0.11 mol) of N,N-dimethylaniline hydrochloride and 100 ml. of toluene were put into a three-mouthed round-bottomed flask of a capacity of 300 ml. fitted with an agitator, thermometer and reflux condenser. The mixture was agitated at 60° C. for 4 hours and then cooled. The crystals of dimethyl aniline were separated by filtration. The filtrate was returned to the reaction flask and ammonia gas was introduced at a velocity of 100 ml. per minute for 1 hour with agitation at 50 to 70° C. The slurry produced was transferred to an autoclave (capacity of 500 ml.) and was amidated with 38 ml. of 28% ammonia water (0.6 mol) at 120 to 140° C. under 12 atmospheres for 3 hours. After the cooling, the reaction mixture was separated by filtration and the crystals were thoroughly water-washed and dried to obtain 17.5 g. of crude crystals. When they were recrystallized from dioxane-methanol (at 1:1), 15.0 g. of bis(2,4-diamino - s - triazine - 6 - yl - oxy) - dodecamethylene of a melting point of 229 to 231° C. were obtained. The values from analysis are shown as follows:

Analyzed elements.—Test values (percent): C, 51.23; H, 7.79; N, 32.95. Theoretical values (percent): C, 51.41; H, 7.67; N, 33.31.

Three aqueous solutions of 37.1% formaldehyde and 3.7% methanol with 0.01, 0.005 and 0.002%, respectively, of bis(2,4 - diamino - s - triazine - 6 - yl - oxy) - dodecamethylene were heated at 60° C. for 2 hours and the insoluble matter was removed by filtering at room temperature. During storage at 0° C., the deposition of paraformaldehyde crystals was prevented for 14, 14 and 2 days, respectively.

When the stabilized formaldehyde solutions were subjected to the same foam test as in Example 1, the foam completely vanished within 10 seconds after shaking was stopped.

EXAMPLE 6

13.0 g. of bis(2,4 - diamino - s - triazine - 6 - yl - oxy)-decamethylene of a melting point of 218 to 223° C. were obtained in the same manner as in Example 5 except that 8.7 g. (0.05 mol) of decamethylene glycol were used instead of the dodecamethylene glycol in Example 5. The analysis values are shown as follows:

Analyzed elements.—Test values (percent): C, 49.22; H, 7.26; N, 34.91. Theoretical values (percent): C, 48.96; H, 7.19; N, 35.69.

Three aqueous solutions of 37.1% formaldehyde and 3.7% methanol with 0.01 and 0.005%, respectively, bis(2,4 - diamino - s - triazine - 6 - yl - oxy) - decamethylene were heated at 60° C. for 2 hours. The mixture was then filtered at room temperature to remove the insoluble matter and stored at 0° C. The deposition of paraformaldehyde crystals was prevented for 16 and 3 days, respectively.

When the stabilized formaldehyde solutions were subjected to the same foam test as in Example 1, the foam completely vanished within 10 seconds after shaking was stopped.

EXAMPLE 7

10.5 g. of bis(2,4-diamino-s-triazine-(6-yl-oxy)-nonamethylene of a melting point of 240 to 245° C. were obtained by the procedure in Example 5 except that 7.7 g. (0.05 mol) of nonamethylene glycol were used instead of the dodecamethylene glycol. The values from analysis are shown as follows:

Analyzed elements.—Test values (percent): C, 47.69; H, 7.13; N, 36.98. Theoretical values (percent): C, 47.61; H, 6.93; N, 37.01.

Two aqueous solutions of 37.1% formaldehyde and 3.7% methanol with 0.02 and 0.01%, respectively, bis(2,4-diamino-s-triazine-6 - yl-oxy)-nonamethylene were heated at 60° C. for 2 hours. The insoluble matter was removed by filtration at room temperature. During storage at 0° C., the deposition of paraformaldehyde crystals was prevented for 13 and 4 days, respectively.

When the stabilized formaldehyde-methanol solution was subjected to the foam test as in Example 1, the foam completely vanished within 10 seconds after shaking was stopped.

The amidating reaction is conducted by reacting ammonia on the slurry immediately after the completion of the above reaction or on the filtrate after the slurry has cooled and the hydrochloride of the acid scavenger has been removed. The amidating reaction may be conducted either by introducing gaseous ammonia or by adding an excess of ammonia water over the amount required. Also, carbon atoms having the two chlorine atoms remaining in the s-triazine skeleton may be amidated either simultaneously or in succession as shown in the above-mentioned equations. However, when amidating the carbons in succession, the second amidating reaction requires more severe conditions than in the first amidating reaction. That is, when an ammonia gas is introduced at a temperature above 40° C. into the above-mentioned slurry or filtrate containing a 2,4-dichloro-s-triazine derivative (or ammonia water is added to it with agitation at room temperature) a primary amidating reaction takes place and the reaction mixture becomes a slurry containing ammonium chloride and a 2-amino-4-chloro-s-triazine derivative. This slurry is then agitated for 2 to 5 hours in a sealed container together with an excess amount of ammonia water (or liquid ammonia) at a temperature above 100° C., preferably at 110 to 150° C., in order to prevent secondary reactions such as a deammoniating polycondensation. Also, the temperature of the slurry can be elevated to 110 to 150° C. and ammonia gas is introduced for 10 to 40 hours to complete the second amidation. After the amidation reaction, the system is cooled to room temperature and the product is deposited as crystals which are separated by filtration or by distilling off the solvent. The crystalline product is thoroughly washed with water to remove ammonium chloride, dried and washed with methanol to remove by-products. Instead of washing with methanol, the product may be recrystallized from methyl Cellosolve, dimethyl formamide or dioxane.

Another embodiment of the present invention relates to using the compounds of the present invention to stabilize a formaldehyde solution. The compounds may be used either individually or as a mixture of two or more and even together with other formaldehyde-solution stabilizers. Further, these added compounds may be irradiated with ultraviolet rays. Usually these compounds are added to a formaldehyde solution and are then heated at 50 to 80° C. for 2 to 4 hours as a pretreatment and if crystals are produced they are removed by filtration at room temperature. But usually the filtering operation is unnecessary.

The following examples are illustrative of the present invention.

EXAMPLE 1

2,4 - diamino-6-(12-hydroxy-n-dodecoxy)-s-triazine was synthesized in the following manner. 21.0 g. (0.114 mol) of cyanuric chloride in a four-mouthed round-bottomed flask of a capacity of 200 ml. fitted with an agitator, thermometer, reflux condenser and dropping funnel were dissolved by adding 70 ml. of toluene. A solution of 22.0 g. (0.11 mol) of dodecamethylene glycol and 16.0 g. (0.13 mol) of dimethyl aniline dissolved in 70 ml. of dioxane was added through the dropping funnel with agitation at 20 to 30° C. The temperautre was raised and the agitation continued at 55 to 60° C. for 4 hours. The reaction mixture was cooled and the crystals of the dimethyl aniline hydrochloride were separated by filtration. The filtrate was returned to the reaction flask, as ammonia gas was introduced at a velocity of 100 ml. per minute for 50 minutes with agitation at 50 to 70° C. The slurry produced was transferred to an autoclave having a capacity of 500 ml. Thirty-eight ml. of 28% ammonia water (0.6 mol) and 200 ml. of dioxane were added to complete amidation at 120 to 140° C. under a pressure of 12 atmospheres for 3 hours. After cooling and filtering the filtrate was concentrated under a reduced pressure to distill off the water and organic solvent. The crude crystals were thoroughly washed with water and dried to obtain 31.0 g. of crystals. After recrystallization from dioxane, 20.0 g. of 2,4-diamino-6-(12-hydroxy-n-dodecoxy)-s-triazine having a melting point of 153 to 156° C. were obtained. The resulting values from analysis are shown as follows:

Analyzed elements.—Test values (percent): C, 57.90; H, 9.20; N, 22.54. Theoretical values (percent): C, 57.85; H, 9.39; N, 22.49.

Three aqueous solutions of 37.1% formaldehyde, 3.7% methanol were treated with 0.01, 0.005 or 0.0025%, respectively, 2,4-diamino-6-(12-hydroxy - n - dodecoxy)-s-triazine, were heated at 60° C. for 2 hours and stored at 0° C. The deposition of crystals of paraformaldehyde from the three solutions was prevented for 14, 7 and 5 days, respectively. When the same formaldehyde-methanol solutions treated with 0.05 or 0.01%, respectively, benzoguanamine were tested for comparison, the former prevented deposition of paraformaldehyde crystals for 5 days but the latter was completely ineffective. When the same formaldehyde-methanol solutions were treated with 0.005 or 0.01% 2,4-diamino-6-dodecoxy-s-triazine for comparison, they were effective for 7 and 10 days, respectively.

Two aqueous solutions of 44% formaldehyde and 4% methanol were heated at 65° C. with 0.01 and 0.005%, respectively, 2,4 - diamino-6-(12-hydroxy-n-dodecoxy)-s-triazine for 2 hours and then stored at 10° C. The deposition of crystals of paraformaldehyde was prevented for 7 and 5 days, respectively. When the same formaldehyde-methanol solution was treated with 0.05% benzoguanamine, crystals of paraformaldehyde were deposited rapidly at 10° C.

The destruction of foams produced by strong shaking was tested as follows. An aqueous solution of 37.1% formaldehyde and 3.7% methanol containing 0.01% 2,4-diamino-6-(12-hydroxy - n - dodecoxy) - s - triazine was heated at 60° C. for 2 hours and was then cooled to room temperature. Fifty ml. of the solution were put into a test tube having an inside diameter of 28 mm. The test tube was tightly plugged and shaken at a rate of 90 strikes per minute with an amplitude of 10 cm. at a temperature of 20° C. by a shaking machine. The machine was stopped and the solution evaluated by determining the rate at which the foam vanished. The foam produced by shaking completely vanished in 10 seconds from the time shaking was stopped. When the same formaldehyde-methanol solution with 0.01% 2,4-diamino-6-dodecoxy-s-triazine or 0.05% benzoguanamine instead of the 2,4-diamino-6-(12-hydroxy-n-dodecoxy)-s-triazine was tested, foams of 30 mm. remained in the case of the 2,4-diamino-6-dodecoxy-s-triazine and foams of 10 mm. remained in the case of the benzoguanamine, after shaking was stopped. It was necessary to leave the solutions standing for 6 hours and 3 minutes, respectively, in order to disperse the foams.

EXAMPLE 2

The procedure of Example 1 was followed except that 19.1 g. (0.11 mol) of decamethylene glycol were used instead of the dodecamethylene glycol. 21.5 g. of 2,4 - diamino - 6 - (10 - hydroxy - n - decoxy) - s - triazine of a melting point of 150 to 154° C. were obtained. The values from analysis are shown as follows:

Analyzed elements.—Test values (percent): C, 54.82; H, 8.64; N, 24.66. Theoretical values (percent). C, 55.10; H, 8.89; N, 24.72.

When an aqueous solution of 37.1% formaldehyde and 3.7% methanol was heated with 0.02 or 0.01% 2,4-diamino - 6 - (10 - hydroxy - n - decoxy) - s - triazine at 60° C. for 2 hours and stored at 0° C. for 2 hours, crystals of paraformaldehyde were not deposited for at least 12 or 4 days, respectively. When the same formalde-

What is claimed:
1. A compound corresponding to the formula

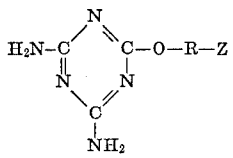

wherein R is an alkylene having 1 to 16 carbon atoms, Z is selected from the group consisting of

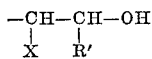

and

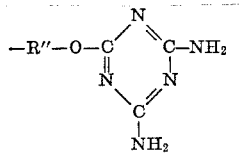

wherein X is selected from the group consisting of hydrogen and hydroxyl, R' is selected from the group consisting of hydrogen and an alkyl having 1 to 9 carbon atoms, R" is an alkylene having 2 to 17 carbon atoms, R and R' have a total of 4 to 16 carbon atoms and R and R" have a total of 6 to 18 carbon atoms.

2. The invention of claim 1 wherein the compound is 2,4-diamino-6-(12-hydroxy-n-dodecoxy)-s-triazine.

3. The invention of claim 1 wherein the compound is 2,4-diamino-6-(10-hydroxy-n-decoxy)-s-triazine.

4. The invention of claim 1 wherein the compound is 2,4-diamino-6-(12-hydroxy-n-octadecoxy)-s-triazine.

5. The invention of claim 1 wherein the compound is 2,4-diamino-6-(9,10-dihydroxy-n-octadecoxy)-s-triazine.

6. The invention of claim 1 wherein the compound is bis(2,4-diamino-s-triazine-6-yl-oxy)-dodecamethylene.

7. The invention of claim 1 wherein the compound is bis(2,4-diamino-s-triazine-6-yl-oxy)-decamethylene.

8. The invention of claim 1 wherein the compound is bis(2,4-diamino-s-triazine-6-yl-oxy)-nonamethylene.

References Cited
UNITED STATES PATENTS
3,255,191    6/1966    Dexter et al. ____ 260—249.8 X JOHN M. FORD, Primary Examiner U.S. Cl. X.R.
252—401; 260—606